United States Patent [19]

Kurachi

[11] Patent Number: 5,560,949

[45] Date of Patent: Oct. 1, 1996

[54] METHOD OF SHAPING GUMMY SUBSTANCE

[75] Inventor: Hideo Kurachi, Nagoya, Japan

[73] Assignee: Miwa Nosan Kako Co., Ltd., Japan

[21] Appl. No.: 480,610

[22] Filed: Jun. 8, 1995

[51] Int. Cl.[6] .................................................... A23P 1/02
[52] U.S. Cl. .................. 426/285; 426/443; 426/453; 426/455; 426/465; 426/573; 426/578
[58] Field of Search .................................. 426/285, 661, 426/573, 578, 443, 446, 450, 455, 463, 464, 465, 453

[56] References Cited

U.S. PATENT DOCUMENTS

| | | | |
|---|---|---|---|
| 3,620,762 | 11/1971 | Yoshida et al. | 426/626 |
| 3,628,966 | 12/1971 | Katsuya | 426/302 |
| 4,192,900 | 3/1980 | Cheng | 426/579 |
| 4,988,531 | 1/1991 | Moore et al. | 426/578 |
| 5,211,977 | 5/1993 | Hauser et al. | 426/557 |
| 5,291,877 | 3/1994 | Conde-Petit et al. | 426/661 |

*Primary Examiner*—Esther Kepplinger
*Assistant Examiner*—Lien Tran
*Attorney, Agent, or Firm*—Dykema Gossett PLLC

[57] ABSTRACT

A method of shaping gummy substance by mixing starch and water together forming a mixture and then compressing and kneading the mixture to a swelling ratio of between about 10 and about 30 and a water content of between about 20% and about 60% and then shaping the mixture by granulating rolls having surfaces maintained at a temperature of not higher than 60° C. into granules.

19 Claims, No Drawings

METHOD OF SHAPING GUMMY SUBSTANCE

FIELD OF THE INVENTION

The present invention generally relates to a method of shaping gummy substance and more particularly, relates to a method of shaping gummy substance by mixing a gel-forming substance with water, kneading the mixture to a predetermined swelling ratio and then shaping the mixture into granules by granulating rolls having surfaces maintained at a temperature at or below 60° C.

BACKGROUND OF THE INVENTION

Shaped granules of starch or of a mixture of starch and other materials have been used as raw materials for prepared foods including as a rice substitute and as other food items. For instance, U.S. Pat. Nos. 3,628,966 and 3,620,762 disclosed methods of preparing enriched artificial rice containing nutrients such as amino acids, vitamins and minerals by semi-gelatinizing those mixtures with water and granulating. However, these methods have severe drawbacks and disadvantages in the granulating process when starch is used as the only raw material. As a results, binder materials such as gum or gluten must be added to the mixture in order to make the granulating process possible. The prior art methods also teach a process of steaming a mixture of nutrient, binder and starch before the granulating process in order to semi-gellatinize the starch by the binder. However, such steaming process is only effective to gelatinize the surface layer of the granules and the resulting gelatinization is not homogenous. One other drawback of the prior art methods is that the steaming step before granulating causes undesirable adhesion of the granules to the granulating rolls producing granules of poor shape.

It is therefore an object of the present invention to provide a method of shaping gummy substance from starch that does not have the drawbacks and shortcomings of the prior art methods.

It is another object of the present invention to provide a method of shaping gummy substance from a mixture that contains only starch and water.

It is a further object of the present invention to provide a method of shaping gummy substance from a mixture of starch and water for preparing a food item.

It is still another object of the present invention to provide a method of shaping gummy substance from a mixture of starch and water by using a set of granulating rolls.

It is yet another object of the present invention to provide a method of shaping gummy substance from a mixture of starch and water for preparing a rice substitute.

It is another further object of the present invention to provide a method of shaping gummy substance from a mixture of starch and water with a set of granulating rolls having their surface temperatures kept at or below 60° C.

It is still another further object of the present invention to provide a method of shaping gummy substance from a mixture of starch and water with a set of granulating rolls and then steaming and drying the granules.

It is yet another further object of the present invention to provide a method of shaping gummy substance from a mixture of starch and water such that the granules can be suitably used as a special low protein diet.

It is yet another further object of the present invention to provide a method of shaping gummy substance from a mixture of starch and water into granules that are suitable for Sake brewing.

SUMMARY OF THE INVENTION

In accordance with the present invention, a method of shaping gummy substance from a mixture of starch and water through a compression, kneading and granulating process is provided.

In the preferred embodiment, shaped gummy substance can be produced by compressing and heading a mixture of starch and water to a swelling ratio of between about 10 and about 30 and a water content between about 20% and about 60%. The kneaded mixture is then passed through double granulating rolls having cavities on the roll surfaces of a predetermined shape and a surface temperature of not higher than 60° C. Granules of perfect shape can be produced without any adhesion problems to the roll surface.

In an alternate embodiment, the prepared granules are further steamed for a preset length of time at a temperature between about 70° and about 120° C. and then dried to a water content of less than 20%.

The shaped gummy substance can be used as a medical diet for patients who are limited to the intake of protein and phenylalanine. The shaped gummy substance may also be used as a rice substitute for brewing Sake.

DETAILED DESCRIPTION OF THE PREFERRED AND ALTERNATE EMBODIMENTS

The present inventive method of preparing shaped gummy substance utilizes only one major dry component of starch as the raw material and contains protein at less than 5%, and preferably at less than 1%. All percentages used throughout this specification are weight percents.

The starch used as the raw material may be a mixture of one or more starches selected from corn, waxy maize, potatoes, tapioca, sago, arrowroot, rice, wheat and their modified (etherified or esterified) forms.

The method of preparing the shaped gummy substance includes the step of first compressing and heading starch and water together to a swelling ratio of between about 10 and about 30 and a water content of between about 20% and about 60%. The term "swelling ratio" means water swelling capacity or the water binding capacity. The swelling ratio can be used as an analytical method to determine the alphatization ratio of starch or any other gel-forming material that swells in water. A description of a procedure to determine the swelling ratio is given by Leach, et al. in Cereal Chem, 36, 534 (1959). The procedure can be summarized as follows. A sample of 1 gram weight is first measured in a centrifugal tube. 1 ml of methanol is added and then the tube is filled with 50 ml of water and kept at 25° C. with occasional shaking for 20 minutes. The sample is then centrifuged at 4500 rpm for 30 min. The supernatant is dried on a boiling bath and at 110° C. in vacuum. The dried matter is measured of its weight. The sediment is weighed and then the swelling ratio can be calculated by the following equation: swelling ratio=sediment in mg/1000−10 S wherein S stands for solubility and is obtained by dried matter of supernatant in mg/10.

The water content and the swelling ratio of the compressed and headed mixture of starch and water are both important in order to produce a good granulating condition.

When the water content is below 20% or over 60%, a perfect shape of the granules after the granulating process cannot be obtained. A more preferred water content is between about 30% to about 45%.

When the swelling ratio is below 10, the gummy substance cannot be granulated. When the swelling ratio is higher than 30, adhesion problems to the roll surface prevents a satisfactory granulating process. A more preferred swelling ratio for the present invention is between about 15 to about 25.

A double compression roll-type kneader or a screw-type continuous kneader equipped with a vacuum deaerator may be suitably used for the present invention kneading process. One of such continuous kneader is supplied by the Ishikawa Toki Go., Ltd.

The headed mixture of starch and water is passed through a twin roll type granulator having cavities of predetermined granule shape (such as of the shape of rice or other grains) on the surface of the rolls and granulated into granules of desirable shape. It is more preferable to use a twin roll type granulator that has chromium or other metal plated rolls to smooth the surfaces. During the granulating process, the temperature of the roll surface should be kept at or below 60° C. so as to prevent adhesion of the granules to the roll surface. This is especially important after an extended operation of the rolls. On the roll surface, vaporized moisture of the headed mixture condenses to dews on the roll surface when the surface temperature is kept lower than 60° C. The resultant water film formed on the roll surface also prevents the adhesion of the headed mixture to the surface. It is more preferable to keep the temperature of the roll surface below the ambient temperature.

In an alternate embodiment of the present invention, the granules are further steamed at a temperature between about 70° and about 120° C. for a time period between about 2 and about 30 minutes. The steamed granules are then dried to a water content of less than about 20%. In some specific applications, such as that for Sake brewing where the granules are used as a rice substitute, it may be desirable that the steamed granules to be dried at a temperature of between about 150° and about 250° C. in order to obtain a more porous structure. A desirable porosity of the granules is between about 40% and about 90%.

One suitable application of the present inventive method of shaping gummy substance is the making of rice substitute which can be suitably used for cooking. The cooked rice substitute maintains its agreeable rice-like shape and further, has a non-sticky, rice-like texture. Due to its desirable low protein content of less than 5, the rice substitute can be suitably used as a medical diet for patients having phenylketonuira or renal disease who are limited to the intake of phenylalanine or protein.

Another suitable application of the present inventive method of shaping gummy substance is the production of granules suitable for Sake brewing. When used in an application of Sake brewing, the granules of the gummy substance are used as a substitute for rice. The rice substitute can be preferably added during the third or the fourth fermentation step for Sake, generally known as Kake. It has been found that the advantages of using this rice substitute in Sake brewing are numerous. First, a steaming process is not required which is different than the conventional method using natural rice. Secondly, a clear and good flavored Sake can be obtained when rice substitute is used in brewing. In a conventional Sake brewing process, the rice used is ground of its proteinatious surface to produce a yield ratio of 65% to 40% in order to reduce its protein content from 10% to 2%. The protein is hydrolyzed to amino acids in brewing and the formed amino acids affect the Sake quality with undesirable flavor. The properties of the gummy substance granule is similar to natural rice which facilitates its handling and mixing process and enables a good flow or floating property in brewing. Another added benefit is that there is no excess acid that is formed compared with liquid starch hydrolysate.

The present inventive method of shaping gummy substance is further illuminated in the following illustrated examples which are not to be taken as limiting the scope of the present invention in any way.

EXAMPLE 1

In this example, 100kg of corn starch containing protein at 0.3% is mixed with 38 kg of water and then kneaded in a double compression roll-type header for 15 minutes. A mixture of uniform consistency having a swelling ratio of 19.3 and a water content of 36% is obtained. The headed mixture is then passed through a twin roll-type granulator equipped with roll surfaces having cavities of granule shape and granulated into granules. The temperature of the roll surface is kept at between about 45° C. to about 55° C.

Optionally, the granules can be steamed for 10 minutes at a temperature of about 100° C. and then dried in a hot air dryer for 15 minutes at about 125° C. Shaped gummy substance of a rice substitute is obtained which has a water content of 15% and a protein content of 0.3%. The granules of this rice substitute maintain a rice-like shape.

EXAMPLE 2

In this example, 950 kg of rice starch containing 0.8% protein and 50 kg of hydroxypropylated tapioca starch containing 0.2% protein are mixed together first and then 480 kg of water is added to form a final mixture. The mixture is kneaded in a screw-type continuous kneader equipped with a vacuum deaerator for 15 minutes. A mixture of uniform consistency having a swelling ratio of 16.3 and a water content of 40% is produced. The kneaded mixture is then passed through a twin roll type granulator that have cavities of a specific granule shape on the roll surfaces. Cooling water is circulated in the granulating roll for cooling purpose. The headed mixture is granulated into rice-like granules while the surfaces of the rolls are kept at between about 45° and about 50° C. In one experiment, the granulating roll was run for continuous three hours while no adhesion to the roll surface by the granules is noticed and further, the granules maintain a good rice-like shape.

Optionally, the granules can be steamed for 5 minutes at a temperature of about 100° C. and then dried in a hot air dryer for 1 hour at a temperature of about 100° C. The resulting enriched rice substitute from the present invention method of shaping gummy substance contains 11% water and 0.77% protein.

In yet another embodiment, 100 g of the rice substitute is cooked in 1000 g of boiling water for 15 minutes and then drained with a riddle. It was noticed that the cooked rice substitute maintains a rice-like shape and has a non-sticky good texture.

EXAMPLE 3

In this example, 60 kg of potato starch containing 0.2% protein and 25 kg of wheat starch containing 0.2% protein are first mixed together. 45 kg of water is then added and the mixture is headed and compressed in a screw-type continuous header equipped with a vacuum deaerator for 15 minutes. A mixture of uniform consistency having a swelling ratio of 16.3 and a water content of 40% is obtained. The kneaded mixture is then passed through a twin roll type granulator having cavities of specific granule shapes on the roll surfaces and granulated into granules of rice substitute. The temperature of the roll surfaces is kept at between about 20° C. to about 30° C.

In an alternate embodiment, the granules are steamed for 5 minutes at a temperature of 100° C. and dried in a hot air dryer for 1 hour at a temperature of 100° C. The resulting rice substitute has a water content of 11%. The granules are then dried in a hot air dryer for 10 minutes at a temperature of 105° C. The resulting enriched rice substitute has a water content of 10% and a protein content of 0.2%.

In still another embodiment, a mixture of 100 g of the rice substitute and 100 g of Indica rice is cooked in 300 g of boiling water for 15 minutes and then drained with a riddle. The boiled mixture is then lightly fried with butter and flavoring. The final product of a light fried rice substitute mixture has an agreeable rice-like shape and a non-sticky texture.

EXAMPLE 4

In this example, 100 kg of corn starch having a 0.2% protein content and 36 kg of water are mixed together and kneaded in a double compression roll-type header for 10 minutes. A mixture of uniform consistency having a swelling ratio of 26.7 and a water content of 32% is obtained. The kneaded mixture is then passed through a twin roll type granulator having cavities of specific granule shape on the roll surfaces and granulated into specific granules. The temperature of the roll surface is kept at between about 40° C. to about 55° C.

In an alternate embodiment, the granule can be steamed for 5 minutes at 110° C. and then dried in a hot air dryer for 2 hours at a temperature of 85° C. The resulting enriched rice substitute has a water content of 12% and a protein content of 0.2%.

In yet another alternate embodiment, 200 g of this rice substitute is cooked in 1000 g of boiling water for 15 minutes and then drained with a riddle. The cooked rice substitute maintains an agreeable rice-like shape and has a non-sticky texture. It is suitable for serving as a medical diet for patients suffering from phenyl-keton-urea or renal disease who are limited to the intake of phenylalanine or protein.

EXAMPLE 5

In this example, 100 kg of cornstarch containing 0.2% protein are mixed with 38 kg of water and kneaded in a double compression roll-type header for 15 minutes to achieve a swelling ratio of 19.3 in the mixture. The kneaded mixture is then passed through a twin roll type granulator having cavities of specific granule shape on the roll surfaces and granulated into the specific granule shape. The temperature of the roll surface is kept at between about 40° C. to about 60° C.

In an alternate embodiment, the granule may optionally be steamed for 10 minutes at a temperature of 100° C. and then dried in a hot air dryer for 3 minutes at a temperature of 200° C. The resulting rice substitute has a water content of 8% and a protein content of 0.2%. The porosity of the granule is found to be 73%.

In yet another embodiment, 2.4 kg of this product is added during the third step of Sake brewing process called Kake. Some of the essential processing conditions of the Sake brewing process can be described as follows. The total rice substitute used is 6kg and the rice's grind ratio by yield is 60%. The ratio of water/rice is 140%. The ratio of malted rice is 25%. The yeast utilized is Japanese Sake Brewing Association No. 9. A conventional three-step brewing process is followed wherein temperature is kept at between 14° and 17° C. and the total brewing period is 23 days followed by a filtering process.

As a comparative test, the same amount of rice having a grind ratio of 60% or dried corn syrup (DE30) are added respectively instead of the rice substitute in the third step of Sake brewing process under the same processing conditions, with the only exception that the rice is steamed. The result of the comparative test indicates that the brewed Sake using rice substitute showed a more clear appearance and a more superior taste in the taste evaluations. Some of the test data are shown below.

TABLE 1

|  | artificial rice | rice | corn syrup |
| --- | --- | --- | --- |
| alcohol (%) | 15.6 | 16.1 | 15.9 |
| alcohol yield (L/1000 kg-rice) | 330 | 350 | 360 |
| amino acidity | 1.3 | 2.7 | 1.3 |
| acidity | 2.5 | 2.4 | 3.7 |
| taste evaluation* | 2.3 | 3.0 | 3.8 |

*average of 6 persons of a 5-degree taste evaluation test (1: very good, 2: good, 3: normal, 4: bad, 5: very bad)

EXAMPLE 6

In this example, 100 kg of semolina wheat flour was mixed with 38 kg of water so that it was adjusted to have a water content of 37.5% and kneaded in a continuous header (ISHIKAWA TOKI CO., Ltd.) at a temperature of 85° C. to form a mixture having a swelling ratio of 24.5. The processed mixture was then granulated in a twin roll-type granulator that has hemisphere cavities (7 mm diameter) in the roll surface and having a surface temperature maintained at 50° C. into spherical granules. No adhesion with the roll was noticed and the granules maintained a good shape. The resulting granules were steamed for 30 minutes and dried at 100° C. to a water content of 8% by weight.

EXAMPLE 7

In this example, 50 kg of semolina wheat flour, 45 kg of soy bean powder and 5 kg of methylcellulose were mixed together with 34 kg of water so that it was adjusted to have a water content of 35 % and kneaded in a continuous kneader (ISHIKAWA TOKI Co., Ltd.) at a temperature of 80° C. to form a mixture having a swelling ratio of 1.9.5. The processed mixture was then granulated in a twin roll-type granulator having columnar cavities (9 mm diameter, 3 mm depth) in the roll surface and having a surface temperature maintained at 45° C. into disk shape flake. No adhesion with the roll surface was noticed and the granules maintained a good shape. The resulting granules were steamed for 30 minutes and dried at 100° C. to a water content of 8% by weight.

While the present invention has been described in an illustrative manner, it should be understood that the terminology used is intended to be in a nature of words of description rather than of limitation.

Furthermore, while the present invention has been described in terms of a preferred and several alternate embodiments thereof, it is to be appreciated that those skilled in the art will fatherly apply these teachings to other possible variations of the invention. For instance, substances other than the rice substitute taught in the present invention made by a mixture of starch and water may also be shaped by the present invention shaping method.

The embodiments of the invention in which an exclusive property or privilege is claimed are defined as follows:

1. A method of shaping a gel-forming substance into granules comprising the steps of:

mixing a gel-forming substance with water into a mixture containing between about 20 and about 60 weight percent water;

kneading said mixture to a swelling ratio between about 10 and about 30;

shaping said mixture into granules by granulating rolls having surfaces maintained at a temperature not higher than 60° C.; and steaming said shaped granules.

2. A method according to claim 1 further comprising the steps of drying said granules such that a water content of less than 20 weight percent in the granules is obtained.

3. A method according to claim 2, wherein said steaming step is at a temperature of at least 70° C. for a period of at least 2 minutes.

4. A method according to claim 1, wherein said gel-forming substance comprises substantially of starch.

5. A method according to claim 1, wherein said gel-forming substance is at least one member selected from the group consisting of corn starch, potato starch, rice starch, waxy maize, tapioca, sago, wheat, arrowroot and their modified forms.

6. A method according to claim 1, wherein said granulating rolls have surfaces engraved with a plurality of cavities each resembles the shape of said granules.

7. A method according to claim 2, wherein said granules are dried at a temperature of at least 150° C.

8. A method according to claim 2, wherein said granules are dried at a temperature between about 150° C. and about 250° C.

9. A method according to claim 2, wherein said granules after drying having a porosity of at least 40%.

10. Shaped granules obtained according to the method of claim 1.

11. Shaped granules obtained according to the method of claim 1 further comprising protein of not more than 5 weight percent.

12. Shaped granules obtained according to the method of claim 1 further comprising protein of not more than 5 weight percent and porosity of not less than 40%.

13. A method of making shaped granules from a gel-forming substance comprising the steps of:

mixing at least one gel-forming substance and water together forming a mixture having between about 20 and about 60 weight percent water;

compressing said mixture to a swelling ratio between about 10 and about 30;

shaping said mixture into granules with granulating rolls, said granulating rolls having surfaces maintained at a temperature not higher than 60° C.;

steaming said granules at a temperature of not less than about 70° C. for a time period of not less than about 2 minutes; and drying said granules to a water content of less than about 20 weight percent.

14. A method according to claim 13, wherein said at least one gel-forming substance includes starch.

15. A method according to claim 13, wherein said at least one gel-forming substance is selected from the group consisting of corn starch, potato starch, rice starch, waxy maize, tapioca, sago, wheat, arrowroot and their modified forms.

16. A method according to claim 13, wherein said granulating rolls having surfaces engraved with a plurality of cavities each resembles substantially to the shape of the granule.

17. A method according to claim 13, wherein said granules are dried at a temperature of at least 150° C.

18. A method according to claim 13, wherein said shaped granules comprising less than 5 weight percent protein.

19. Shaped granules made according to the method of claim 13.

* * * * *